(12) United States Patent
Simon

(10) Patent No.: US 6,723,232 B2
(45) Date of Patent: Apr. 20, 2004

(54) WATER PURIFICATION APPARATUS

(75) Inventor: Munir Simon, Toledo, OH (US)

(73) Assignee: United Export & Import, Inc., Perrysburg, OH (US)

(*) Notice: Subject to any disclaimer, the term of this patent is extended or adjusted under 35 U.S.C. 154(b) by 259 days.

(21) Appl. No.: 09/928,276

(22) Filed: Aug. 10, 2001

(65) Prior Publication Data

US 2003/0029784 A1 Feb. 13, 2003

(51) Int. Cl.[7] .............................. C02F 1/28; C02F 1/32; C02F 9/00; B01D 36/00
(52) U.S. Cl. ............................ 210/87; 210/748; 210/90; 210/254; 210/202; 210/266; 210/134; 210/130; 210/259
(58) Field of Search .................... 210/748, 87, 90, 210/254, 202, 266, 134, 130, 259

(56) References Cited

U.S. PATENT DOCUMENTS

| | | | |
|---|---|---|---|
| 3,276,458 A | * 10/1966 | Iversen et al. | ............ 134/57 R |
| 4,615,799 A | 10/1986 | Mortensen | |
| 4,724,079 A | 2/1988 | Sale et al. | |
| 4,808,287 A | * 2/1989 | Hark | .......................... 210/637 |
| 4,909,931 A | 3/1990 | Bibi | |
| 4,968,437 A | 11/1990 | Noll et al. | |
| 5,024,766 A | * 6/1991 | Mahmud | .................... 210/668 |
| 5,141,636 A | 8/1992 | Flanagan et al. | |
| 5,149,437 A | 9/1992 | Wilkinson et al. | |
| 5,227,053 A | 7/1993 | Brym | |
| 5,415,770 A | 5/1995 | Heskett | |
| 5,498,347 A | * 3/1996 | Richard | ...................... 210/739 |
| 5,536,395 A | 7/1996 | Kuennen et al. | |
| 5,585,003 A | * 12/1996 | Van Newenhizen | ......... 210/646 |
| 5,597,482 A | 1/1997 | Melyon | |
| 5,843,309 A | 12/1998 | Mancil | |
| 5,868,924 A | 2/1999 | Nachtman et al. | |
| 5,972,211 A | * 10/1999 | Jones | .......................... 210/90 |
| 5,980,752 A | 11/1999 | Bowers | |
| 6,120,686 A | 9/2000 | Bilz | |
| 6,197,193 B1 | 3/2001 | Archer | |
| 6,235,191 B1 | * 5/2001 | Nakamura | ................... 210/85 |

* cited by examiner

Primary Examiner—Blaine Copenheaver
Assistant Examiner—Douglas J. Theisen
(74) Attorney, Agent, or Firm—MacMillan Sobanski & Todd, LLC

(57) ABSTRACT

A water purification apparatus for purifying water from a municipal water supply prior to a point of use has multiple water purification units including a carbon filter, a particle filter and an ultraviolet light source connected in series. The carbon filter removes free residual chlorine, the particle filter removes particles including carbon particles from the carbon filter, and the ultraviolet filter kills bacteria. A bypass conduit connected in parallel with the water purification units and valves permit system maintenance during which the water from the supply can flow directly to the point of use.

23 Claims, 2 Drawing Sheets

WATER PURIFICATION APPARATUS

BACKGROUND OF THE INVENTION

The present invention relates generally to water purification systems and, in particular, to a point of use water purification apparatus utilizing a three-step purification process together with a piping bypass.

Water purification systems and methods are well known. Ensuring a safe and healthy water supply free from particle, chemical and microbiological impurities, such as bacteria and the like, is an ongoing concern in many parts of the world. The prior art has recognized this and provided various biocides and other systems aimed at exterminating and/or removing bacteria. Perhaps the most common means for exterminating and/or removing bacteria from water supplies is with the use of chlorine.

Chlorine is a powerful oxidizing agent and biocide and has been used for many years by municipal water treatment systems to disinfect water for personal and commercial use. Although it is an effective biocide and is economical to use, chlorine has been suspected to adversely affect living organisms when supplied at excessive levels beyond that required to exterminate the bacteria. In addition to initially treating the water, the water treatment system also typically supplies a residual, called the free chlorine residual, to maintain a level of chlorine sufficient to protect the water from bacteria throughout the water distribution system and the network leading to its point of use. In order to ensure an effective level of chlorine at the point of use farthest from the source, the chlorine level at points of use closer to the source will be higher than desirable. The impact of the free residual chlorine is disadvantageous and significant. The free chlorine residual alters the odor and taste of water as well as bleaches any colored organic objects including skin and hair. In addition, chlorine is itself suspected to be a carcinogen as well as a key component in the formation of trihalomethanes, which are also carcinogenic.

Despite the disadvantages and risks noted above, chlorine remains arguably the most economical and effective biocide for drinking water ever used and, therefore, its use as a biocide remains prevalent today. Many prior art systems exist that teach means to remove chlorine from water. Other prior art systems exist that teach other biocides as substitutes for chlorine. Most of these prior art removal systems or chlorine substitutes are either cost-prohibitive, difficult to apply, difficult to maintain, or a combination of all of the above.

It is desirable to provide an apparatus for removing chlorine from a municipal water supply that is both economical and simple to apply.

It is also desirable to provide an apparatus for removing chlorine that is simple to operate and maintain. It is also desirable to provide an apparatus that may be maintained while still sustaining water flow for the point of use.

It is, therefore, an object of the present invention to provide an apparatus to eliminate taste, odor, and health-related effects associated with the free chlorine residual provided from a municipal water supply. It is another object of the invention to provide an apparatus for removing chlorine from a municipal water supply at a point of use which apparatus is economical and simple to apply, operate, and maintain.

SUMMARY OF THE INVENTION

The present invention concerns a water purification apparatus for connection to a municipal water supply having a quantity of free residual chlorine. The present invention advantageously removes the free residual chlorine from the municipal water supply just before a point of use. The present invention accomplishes this by connecting the water supply into an inlet of a carbon filter. The carbon filter is preferably sized, based on the capacity of the water supply and the point of use, to absorb the free residual chlorine.

An outlet of the carbon filter is connected to an inlet of a particle filter. It is known in the art that carbon filters typically shed some carbon particles during normal use. The present invention recognizes this, and provides the particle filter, which is preferably a particulate filter that can remove these carbon particles as well as any other solid particles found in the municipal water supply. The particle filter is preferably sized to remove an amount of solids based on the properties of the water supply and the requirements of the point of use. For example, manufacturing requirements may be much stricter in terms of total dissolved solids (TDS) than that of a typical municipal water supply.

An outlet of the particle filter is connected to an inlet of an ultraviolet light source for sanitizing, or disinfecting, the water prior to its point of use. It is known in the art that carbon filters can create an environment suitable for microbiological growth because such filters contain a dark and humid environment. The present invention recognizes this, and provides the ultraviolet light source, which advantageously disinfects the water without impacting the taste or the odor of the water. The ultraviolet light source also disinfects the water instantaneously with no residual effects. The outlet of the ultraviolet light source is connected to the point of use of the water, such as a residence or office building.

The apparatus includes a bypass conduit connected in parallel with the purification units (the carbon filter, the particle filter, and the ultraviolet light source). The bypass is connected between the water supply and the point of use. The water purification apparatus further includes associated valves that are provided to isolate the purification units for performing maintenance on the apparatus.

The present invention advantageously contemplates utilizing low-cost, commercially available standard equipment to eliminate chlorine from drinking water and from water used in food, beverage, and related uses. Furthermore, the present invention advantageously provides the bypass conduit to allow easy maintenance of the components of the present invention. The present invention also extends the life or operating hours of the carbon filter, the particle filter and the ultraviolet light source by utilizing the bypass conduit during periods when the purification process is not needed. For example, during closing hours of a business establishment, office, etc. The bypassed chlorinated water can flow until it is necessary to go back to the purified water during demand or peak use periods. This operation also keeps the bypass conduit bacteria free with the chlorinated water flow. The present invention, therefore, is a low-cost yet effective and efficient means for removing chlorine from a municipal water supply. In addition to domestic potable water use, the present invention contemplates uses in many industrial sectors where chlorine can affect the process or final product characteristics including, but not limited to, the paper, textiles, food, and beverage industries.

In addition, the present invention is scalable in that it is not limited to certain values of water flow, the amount of free residual chlorine, or the amount of TDS. Filter and piping sizes are dependent on a number of factors, including water flow and the amount of free chlorine measured in the water. The components of the present invention (the carbon filter, the particle filter, and the ultraviolet light source) can be custom designed for each specific point of use water distribution system, and it also is within the scope of the present invention to mass produce the components for typical residential applications.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
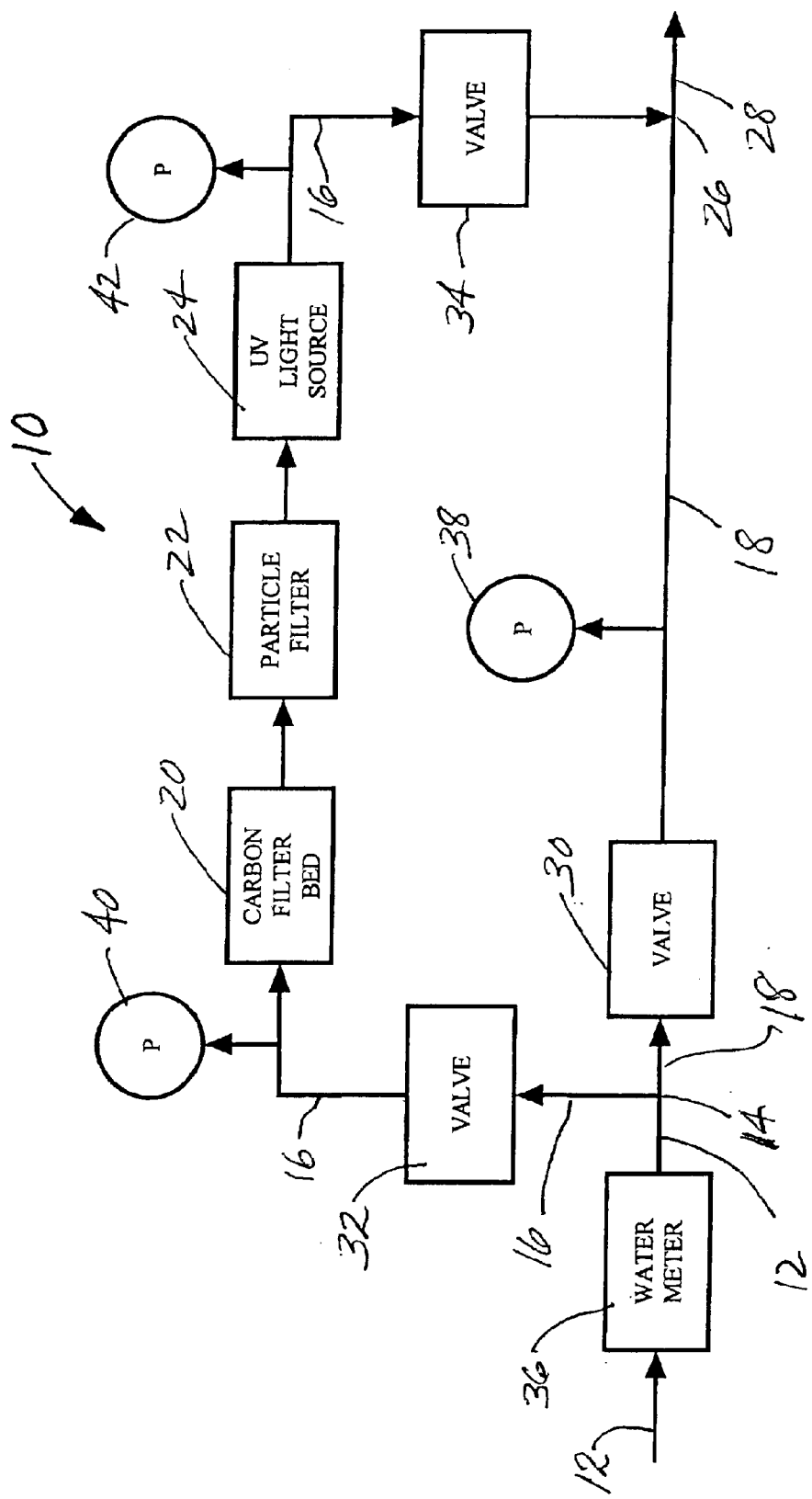
FIG. 1 is a schematic block diagram of a water purification apparatus in accordance with the present invention.

Referring now to FIG. 1, a water purification apparatus is indicated generally at 10. The water purification apparatus 10 includes a water supply inlet conduit 12. The water supply inlet conduit 12 is preferably piping, tubing, or the like that is connected to a chlorinated municipal water supply network (not shown) for receiving water to be used at a point of use for drinking, cooking, bathing, etc. The water supply inlet conduit 12 may be constructed of any suitable conduit material including, but not limited to, steel, copper, or polyvinyl chloride (PVC). The water supply inlet conduit 12 extends to a tee coupling 14, which branches to a filtration apparatus inlet conduit 16 and a bypass conduit 18. The apparatus inlet conduit 16, the bypass conduit 18, and the tee 14 may be constructed of any suitable conduit material including, but not limited to, steel, copper, or PVC.

The apparatus inlet conduit 16 connects to an inlet of a carbon filter bed 20. The carbon filter 20 includes carbon beds (not shown) that have a quantity of activated charcoal (not shown) for absorbing free residual chlorine (not shown) contained in the water flowing from the municipal water supply. The carbon filter 20 is preferably a commercially available carbon filter bed. The carbon filter 20 is preferably sized to remove all or substantially all of the chlorine based upon a maximum flow capacity of the point of use and the amount of chlorine in the water at the supply inlet conduit 12. Alternatively, the carbon filter 20 is formed of two or more such filters connected in parallel and/or series depending on the amount of free chlorine residual to be removed. Typically, two or more filters would be required only in large commercial or industrial applications.

An outlet of the carbon filter 20 is connected to an inlet of a particle filter 22. The particle filter 22 is preferably a particulate filter that can remove carbon particles (not shown) shed from the carbon filter 20 as well as any other solid particles (not shown) found in the water received from the municipal water supply. The particle filter 22 is preferably a commercially available particle filter. The particle filter 22 is preferably sized to remove an amount of solids based on the capacity and properties of the water supply and requirements of the point of use. Alternatively, the particle filter 22 is formed of two or more such filters connected in parallel and/or series depending upon the amount of solids to be removed from the water. As stated above, typically, two or more filters would be required only in large commercial or industrial applications.

An outlet of the particle filter 22 is connected to an inlet of an ultraviolet light source 24 for sanitizing the water prior to its point of use. The ultraviolet light source 24 preferably includes a housing (not shown) with at least one ultraviolet light bulb (not shown) disposed therein for exposing the water to the ultraviolet light rays to kill bacteria. The ultraviolet light source 24 advantageously does not impact the taste or the odor of the water. The ultraviolet light source 24 also sanitizes the water instantaneously with no residual effects. The ultraviolet light source 24 is preferably a commercially available ultraviolet light source. Alternatively, the ultraviolet light source 24 is formed of two or more such light sources connected in parallel and/or series depending upon the amount of bacteria present. As stated above, typically, two or more sources would be required only in large commercial or industrial applications. An outlet of the ultraviolet light source 24 connects to a tee coupling 26, a branch of which is a point of use conduit 28, which is further connected to a point of use (not shown), such as a domestic water faucet, a water inlet for a dwelling, or a water inlet for industrial processing operations. The point of use conduit 28 and the tee 26 may be constructed of any suitable conduit material including, but not limited to, steel, copper, or PVC.

The bypass conduit 18 extends from the first tee 14 to the second tee 26. The water purification apparatus 10 also includes at least three valves, including a bypass valve 30, an inlet valve 32, and an outlet valve 34. The bypass valve 30 is located in the bypass conduit 18 between the tee 14 and the tee 26. The inlet valve 32 is located in the apparatus inlet conduit 16 between the tee 14 and the carbon filter 20. The outlet valve 34 is located in the apparatus inlet conduit 16 between the ultraviolet light source 24 and the tee 26.

During normal operation of the water purification apparatus 10, the bypass valve 30 is closed and the inlet valve 32 and the outlet valve 34 are open. Water flows from the municipal source into the water inlet conduit 12, through the carbon filter 20, through the particle filter 22, through the ultraviolet light source 24, through the point of use conduit 28, and on to the point of use. The water arrives at the point of use free of chlorine, free of solids and free of bacteria.

The carbon filter 20, the particle filter 22 and ultraviolet light source 24 all include parts that will need to be replaced during normal use of the water purification apparatus 10. The frequency of parts replacement in the carbon filter 20 and the particle filter 22 depends in large part on the quality of the municipal water supply and the operating time in use. During maintenance of the water purification apparatus 10, the bypass valve 30 is open, and the inlet valve 32 and the outlet valve 34 are closed. In this valve configuration, maintenance personnel are able to perform maintenance including replacing the activated charcoal carbon filter 20, cleaning or replacing the filter cartridge in the particle filter 22, replacing the ultraviolet light bulbs in the ultraviolet light source 24, and/or performing any other maintenance on the water purification apparatus 10, between the inlet valve 32 and the outlet valve 34, as may be required. All of the maintenance may be performed without completely interrupting the water supply to the point of use and without requiring the drainage of the entire water system. The bypass conduit 18 allows for sanitizing the point of use water distribution network via the existing free chlorine in the water. The bypass conduit 18 may be utilized advantageously during off-peak hours or during times when taste, odor, or other chlorine characteristics are not an issue of significance. Utilizing the bypass conduit 18 during these times can increase the interval required to perform maintenance on the carbon filter 20, the particle filter 22 and ultraviolet light source 24, decreasing the likelihood that the bypass conduit 18 will need to be used during peak hours.

To assist in the maintenance of the water purification apparatus 10, the water supply inlet conduit 12 is connected to an optional water meter 36 that measures the amount of water flowing through the water purification apparatus 10. Information obtained from the water meter 36 can be used to size the system components and adjust them if necessary. The water meter 36 could be the meter typically used by the municipality to measure customer water use.

Preventative maintenance of mechanical systems is typically performed based on an amount of time the system has been in service or an amount of work cycles the system has experienced. Preventative maintenance is also typically based on observed conditions. Preventative maintenance of the water purification apparatus 10 may be performed based on the amount of water that has flowed through the water purification apparatus 10, as measured by the water meter 36. Preventative maintenance may also be performed on the water purification apparatus 10 based on actual pressure differential readings, as measured by at least three optional pressure gages 38, 40, and 42. The pressure gage 38 is located on the bypass conduit 18 between the tee 14 and the tee 26. The pressure gage 40 is located in the apparatus inlet conduit 16 between the tee 14 and the carbon bed filter 20. The pressure gage 42 is located in the apparatus inlet conduit 16 between the ultraviolet light source 24 and the tee 26. A high pressure differential between the pressure gage 40 and the pressure gage 42 will indicate that there likely is a flow restriction in either the carbon filter 20, the particle filter 22 and/or the ultraviolet light source 24, and that maintenance, such as that outlined above, is required on one of those purification devices.

Also, the water meter 36 and the pressure gages 38, 40, and 42 provide signals (not shown) to a control means (not shown), which can monitor the water purification apparatus 10, and alert an operator of the water purification apparatus 10 when maintenance needs to be performed.

Figure 2:
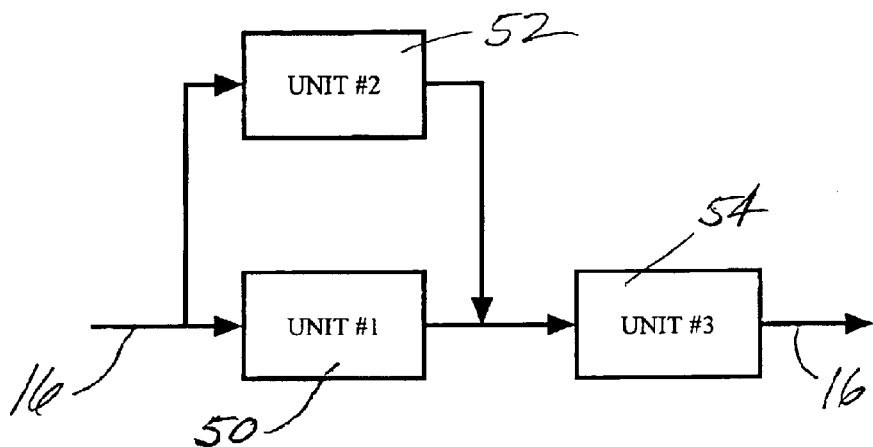
FIG. 2 is a schematic block diagram of an alternate embodiment of the apparatus shown in FIG. 1.

As discussed above, each of the purification units, i.e. the carbon filter 20, the particle filter 22 and the UV light source 24, can be configured as two or more units in parallel and/or series. As shown in FIG. 2, a first unit 50 can be connected in parallel with a similar second unit 52. The parallel connection can be used where one of the units does not have sufficient capacity for the maximum water flow in the inlet conduit 16. Also, the second unit 52 can be added after installation of the water purification apparatus 10 should the maximum water flow increase and exceed the capacity of the first unit 50. A third unit 54 can be connected in series with the first unit 50 when additional purification is required beyond the capacity of the first unit 50 but the maximum flow capacity has not been exceeded. In this case, the second unit 52 may not be required. Additional parallel or series connected units can be added. Clearly, the water purification apparatus 10 can be configured with any desired number of purification units (20, 22, 24) connected in series and/or parallel.

Figure 3:
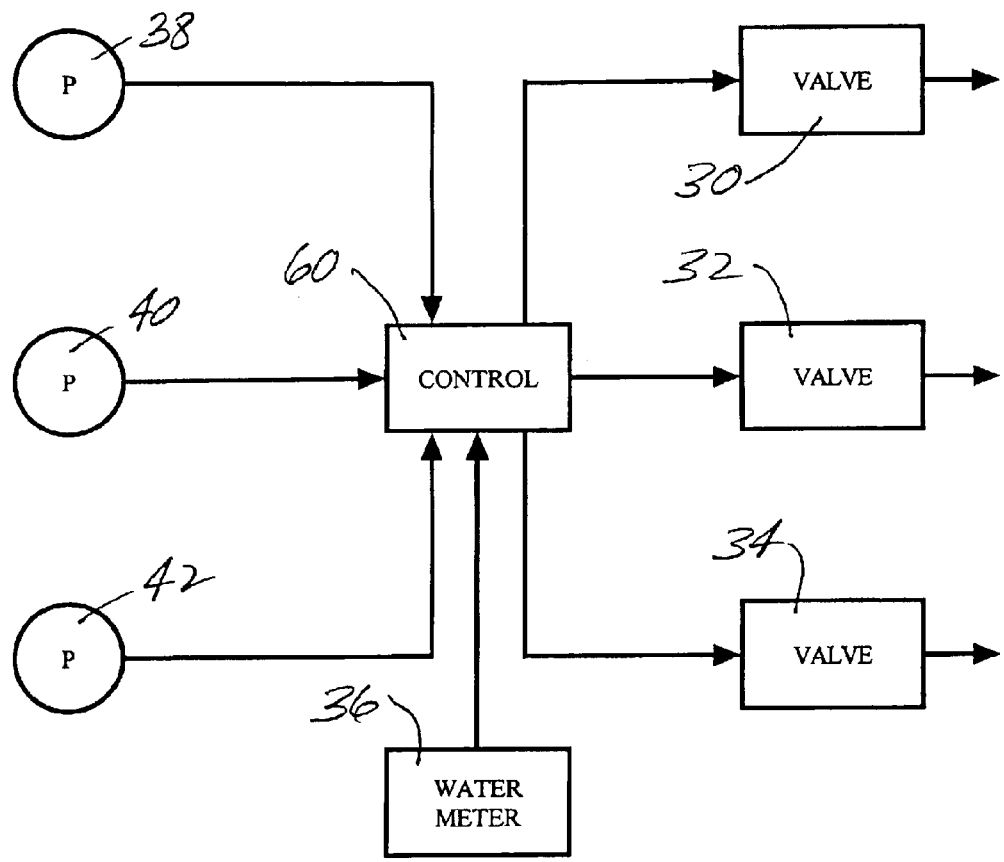
FIG. 3 is a schematic block diagram of a control for the apparatus shown in FIG. 1

There is shown in FIG. 3 a control 60 for the water purification apparatus 10. The pressure gages 38, 40 and 42 are each connected to an input of the control 60 and generate input signals representing the water pressure at the points of connection to the conduits shown in the FIG. 1. The water meter 36 is connected to another input of the control 60. Outputs of the control 60 are connected to actuators of the valves 30, 32 and 34. The control 60 can be any suitable device such as a programmed logic controller (PLC) or a programmed personal computer that responds to inputs such as the sensed pressures (from the gages 38, 40, 42), the water flow rate (from the water meter 36), the time of day (from an internal clock) or operator commands to open and shut the valves.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A dual operation water purification apparatus for purifying drinking water from a supply of water having a quantity of free residual chlorine comprising:

a first water purification means for removing a quantity of the free residual chlorine from drinking water, said first water purification means having an inlet and an outlet;

a second water purification means for removing solids from drinking water and having an inlet and an outlet said inlet of said second water purification means being connected to said outlet of said first water purification means;

a third water purification means for treating drinking water for bacteria and having an inlet and an outlet, said inlet of said third water purification means being connected to said outlet of said second water purification means;

a bypass conduit having a first valve connected intermediate an inlet end and an outlet end;

a second valve connected between said inlet end of said bypass conduit and said inlet of said first water purification means; and a third valve connected between said outlet of said third water purification means and said outlet end of said bypass conduit whereby when said inlet end of said bypass conduit is connected to a supply of drinking water having a quantity of free residual chlorine and said outlet end of said bypass conduit is connected to a point of use, said first valve can be closed and said second and third valves can be opened to provide purified water to the point of use and said first valve can be opened and said second and third valves can be closed to provide chlorinated water to the point of use and prevent the chlorinated water from entering said inlet of said first water purification means and said outlet of said third water purification means.

2. The apparatus according to claim 1 wherein said first water purification means is a carbon filter.

3. The apparatus according to claim 1 wherein said first water purification means is at least two carbon filters.

4. The apparatus according to claim 1 wherein said second water purification means is a particle filter.

5. The apparatus according to claim 1 wherein said second water purification means is at least two particle filters.

6. The apparatus according to claim 1 wherein said third water purification means is an ultraviolet light source.

7. The apparatus according to claim 1 wherein said third water purification means is at least two ultraviolet light sources.

8. The apparatus according to claim 1 including a water meter connected to said bypass conduit inlet for measuring a total amount of water flow into the water purification apparatus.

9. The apparatus according to claim 1 including a first pressure gage connected at said inlet of said first water purification means and a second pressure gage connected at said outlet of said third water purification means, said first and second pressure gages measuring a pressure differential.

10. The apparatus according to claim 1 including a pressure gage connected to said bypass conduit between said first valve and said outlet of said bypass conduit.

11. A dual operation water purification apparatus for purifying water from a supply of water having a quantity of free residual chlorine comprising:

a carbon filter for removing a quantity of the free residual chlorine from water, said carbon filter having an inlet and an outlet;

a particle filter for removing solids from water and having an inlet and an outlet, said inlet of said particle filter being connected to said outlet of said carbon filter;

an ultraviolet light source for treating water for bacteria and having an inlet and an outlet, said inlet of said ultraviolet light source being connected to said outlet of said particle filter;

a bypass conduit having a first valve connected intermediate an inlet end and an outlet end;

a second valve connected between said inlet end of said bypass conduit and said inlet of said carbon filter; and a third valve connected between said outlet of said ultraviolet light source and said outlet end of said bypass conduit whereby when said inlet end of said bypass conduit is connected to a supply of water having a quantity of free residual chlorine and said outlet end of said bypass conduit is connected to a point of use, said first valve can be closed and said second and third valves can be opened to provide purified water to the point of use and said first valve can be opened and said second and third valves can be closed to provide chlorinated water to the point of use and prevent the chlorinated water from entering said inlet of said carbon filter and said outlet of said ultraviolet light source.

12. The apparatus according to claim 11 wherein said carbon filter is at least two carbon filter beds connected together.

13. The apparatus according to claim 11 wherein said particle filter is at least two particle filters connected together.

14. The apparatus according to claim 11 wherein said ultraviolet light source is at least two ultraviolet light sources connected together.

15. The apparatus according to claim 11 including a water meter connected to said bypass conduit inlet for measuring a total amount of water flow into the water purification apparatus.

16. The apparatus according to claim 15 including a control having an input connected to said water meter and outputs connected to said valves for opening and closing said valves in response to a sensed water flow predetermined total amount.

17. The apparatus according to claim 11 including a first pressure gage connected at said inlet of said carbon filter and a second pressure gage connected at said outlet of said ultraviolet light source, said first and second pressure gages measuring a pressure differential.

18. The apparatus according to claim 17 including a control having inputs connected to said pressure gages and outputs connected to said valves for opening and closing said valves in response to a sensed pressure differential.

19. The apparatus according to claim 11 including a pressure gage connected to said bypass conduit between said first valve and said outlet of said bypass conduit.

20. A dual operation water purification apparatus for purifying water from a supply of water having a quantity of free residual chlorine comprising:

an inlet conduit and an outlet conduit;

a carbon filter for removing a quantity of the free residual chlorine from water, said carbon filter having an inlet and an outlet, said inlet of said carbon filter being connected to said inlet conduit;

a particle filter for removing solids from water and having an inlet and an outlet, said inlet of said particle filter being connected to said outlet of said carbon filter;

an ultraviolet light source for treating water for bacteria and having an inlet and an outlet, said inlet of said ultraviolet light source being connected to said outlet of said particle filter, said outlet of said ultraviolet light source being connected to said outlet conduit;

a bypass conduit having a first valve connected intermediate an inlet end and an outlet end, said inlet end of said bypass conduit being connected to said inlet conduit and said outlet end of said bypass conduit being connected to said outlet conduit;

a second valve connected between said inlet conduit and said inlet of said carbon filter; and a third valve connected between said outlet of said ultraviolet light source and said outlet conduit whereby when said inlet conduit is connected to a supply of water having a quantity of free residual chlorine and said outlet conduit is connected to a point of use, said first valve can be closed and said second and third valves can be opened to provide purified water to the point of use and said first valve can be opened and said second and third valves can be closed to provide chlorinated water to the point of use and prevent the chlorinated water from entering said inlet of said carbon filter and said outlet of said ultraviolet light source.

21. The apparatus according to claim 20 including a first pressure gage connected at said inlet of said carbon filter and a second pressure gage connected at said outlet of said ultraviolet light source, said first and second pressure gages measuring a pressure differential.

22. A dual operation water purification apparatus for selectively purifying drinking water from a supply of drinking water having a quantity of free residual chlorine comprising:

a first water purification means for removing a quantity of the free residual chlorine from drinking water, said first water purification means having an inlet and an outlet;

a second water purification means for removing solids from drinking water and having an inlet and an outlet, said inlet of said second water purification means being connected to said outlet of said first water purification means;

a third water purification means for treating drinking water for bacteria and having an inlet and an outlet, said inlet of said third water purification means being connected to said outlet of said second water purification means, whereby when said inlet of said first water purification means is connected to a supply of drinking water having a quantity of free residual chlorine and said outlet of said third water purification means is connected to a point of use, purified drinking water is provide to the point of use; and a bypass means for permitting selective flow of drinking water from the supply of drinking water to the point of use to chlorinate water distribution pipes connected to the point of use.

23. The apparatus according to claim 22 wherein said bypass means includes a bypass conduit having a first valve connected intermediate an inlet end and an outlet end, said inlet end of said bypass conduit being connected to said inlet end of said first water purification means and said outlet end of said bypass conduit being connected to said outlet end of said third water purification means.

* * * * *